(12) United States Patent
Beattie

(10) Patent No.: US 6,223,691 B1
(45) Date of Patent: May 1, 2001

(54) PET CAR SEAT AND CARRY-ALL

(76) Inventor: Thomas R. Beattie, 67 Eastpine Ct., Columbia, SC (US) 29212

( * ) Notice: Subject to any disclaimer, the term of this patent is extended or adjusted under 35 U.S.C. 154(b) by 0 days.

(21) Appl. No.: 09/643,412

(22) Filed: Aug. 22, 2000

Related U.S. Application Data

(63) Continuation of application No. 09/450,090, filed on Nov. 29, 1999, now abandoned.

(51) Int. Cl.[7] ................ A01K 1/02; B62B 3/02
(52) U.S. Cl. ............... 119/453; 119/473; 119/479; 119/496; 280/47.34
(58) Field of Search ..................... 119/452, 453, 119/473, 474, 479, 482, 480, 497, 496, 499, 498, 771, 751, 752; 280/659, 47.34, 47.35

(56) References Cited

U.S. PATENT DOCUMENTS

| | | | |
|---|---|---|---|
| 3,785,344 | * | 1/1974 | Patterson ................ 119/17 |
| 4,109,926 | * | 8/1978 | Lane ....................... 280/39 |
| 4,546,728 | * | 10/1985 | May ........................ 119/19 |
| 4,796,565 | * | 1/1989 | Charbeneau ........... 119/101 |
| 4,838,204 | * | 6/1989 | Young ..................... 119/17 |
| 4,909,188 | * | 3/1990 | Tominaga ............... 119/17 |
| 4,976,219 | * | 12/1990 | Goguen et al. ......... 119/15 |
| 5,113,793 | * | 5/1992 | Leader et al. .......... 119/19 |
| 5,277,148 | * | 1/1994 | Rossignol et al. ..... 119/19 |
| 5,544,619 | * | 8/1996 | Braun ..................... 119/474 |
| 5,577,646 | * | 11/1996 | White ..................... 119/496 |
| 5,785,003 | * | 7/1998 | Jacobson et al. ...... 119/496 |
| 5,810,227 | * | 9/1998 | Jorgensen ............... 119/771 |
| 5,941,195 | * | 8/1999 | Martz ..................... 119/497 |
| 5,988,110 | * | 11/1999 | Peterson ................. 119/453 |

FOREIGN PATENT DOCUMENTS

94/06278 * 3/1994 (WO) ................ 119/453

* cited by examiner

Primary Examiner—Peter M. Poon
Assistant Examiner—Son T. Nguyen
(74) Attorney, Agent, or Firm—Henry S. Jaudon; Cort Flint; Douglas W. Kim

(57) ABSTRACT

The invention is directed to an animal carrier for use inside and outside of vehicles which comprises a cage-like enclosure having a top, a front, a rear, and a pair of sides intersecting with at least the front and a carriage for supporting the enclosure having a bottom, a front, a rear, and a pair of sides intersecting with at least the rear. Attachment members removably connect the cage with the carriage. At least one wedge is secured with the carriage rear and is adapted to be engaged with a seat belt of the vehicle for removably securing the carrier within the vehicle.

13 Claims, 4 Drawing Sheets

PET CAR SEAT AND CARRY-ALL

This application is a continuation of U.S. patent application Ser. No 09/450,090 filed Nov. 29, 1999, now abandoned.

BACKGROUND OF THE INVENTION

This invention relates generally to a device providing secured animal storage and more specifically to a mobile carrier for pets and other small animals. The invention is intended to enable persons to transport their pets and other animals with greater comfort and protection for the animal.

Many facilities such as malls, grocery stores and airports do not allow the entrance of pets or other animals unless they are carried or restrained in some type of pet transport cage. Carrying one's pet becomes tiring and restricts one's movement and ability to use their hands. The pet transport cages available today are cumbersome and do not provide incorporation with the safety features of the carrying vehicle.

The present invention combines a car seat-like design with a mobile carriage-like design that has a greatly improved utility. The present invention is mobile, can be carried by hand, can be pushed or pulled and provides safety, comfort, and ventilation for a pet. In addition, the present invention solves problems that are contained in the prior art. First, the present invention services a dual purpose in that it can be secured by seatbelts in a vehicle and then can be removed and pushed or pulled by hand along the ground. Also, the present invention contains a removable wire cage and a recessed area in the flooring of the enclosure to catch liquid waste. The waste drains into a small box that can be easily removed to dispose of said waste. The present invention contains wheels that can be removed to make the pet carrier more secure and stationary. Lastly, the present invention contains a retractable handle that can be utilized to push or pull the pet enclosure. This makes the carrier easier to manipulate and allows the enclosure to fit more securely into motor vehicles or storage areas.

Accordingly, it is an object of the instant invention to provide a mobile pet carrier which comprises engagement members for engaging with the restraining belt of a vehicle for being fixedly secured with the seat of a vehicle.

Another object of the invention is a mobile pet carrier having a retractable handle for ease of carrier movement and positioning within a vehicle.

Another object of the invention is a mobile pet carrier having removable wheels.

Another object of the invention is a mobile pet carrier having easy access into the storage area.

Another object of the invention is a mobile pet carrier having wheels and an upright handle for ease of movement.

Another object of the present invention is the provision of a mobile pet carrier having a configuration which is car seat friendly.

Another object of the invention is a mobile pet carrier which includes a liquid waste receptacle spaced from the floor area of the carrier.

SUMMARY OF THE INVENTION

The invention is directed to an animal carrier for use inside and outside of vehicles. The carrier includes a cage-like enclosure having a top, a front, a rear, and a pair of sides intersecting with at least the front. It also includes a carriage for supporting the enclosure and comprises a bottom, a front, a rear, and a pair of sides intersecting with at least the rear. Attachment members are provided to removably connect the cage with the carriage.

At least one wedge is secured with the rear of the cage-like enclosures or the carriage. When the carrier is positioned on the vehicle seat the wedge is adapted to be engaged with a seat belt of the vehicle for being fixedly secured to the seat of the vehicle.

The carrier includes casters for rolling movement over a supporting surface. It also includes a handle which provides means for pushing the carrier over the supporting surface. The handle may be collapsible and the casters may be removed from the carrier.

There may be two wedges mounted with the carriage. Each is triangularly shaped with two sides extending in the direction of the rear and a third side extending along a plane substantially perpendicularly of the plane of the rear. Each wedge includes an opening for receiving the seat belt. At least one of the wedges includes an extension extending from one side. The extension is adapted to also engage with the seat belt.

The bottom of the carrier includes an inner upper layer and an outer lower layer, the upper layer extending substantially along a plane perpendicular of the plane along which the back of the carrier extends with the lower layer being contoured to conform with the angle of a vehicle seat. The carrier bottom further includes an inner upper layer and an outer lower layer forming a chamber containing absorbing material. There are perforations formed over the inner layer which opens into the chamber so that liquids deposited onto the upper layer pass through the perforations and are contained by the absorbing material.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
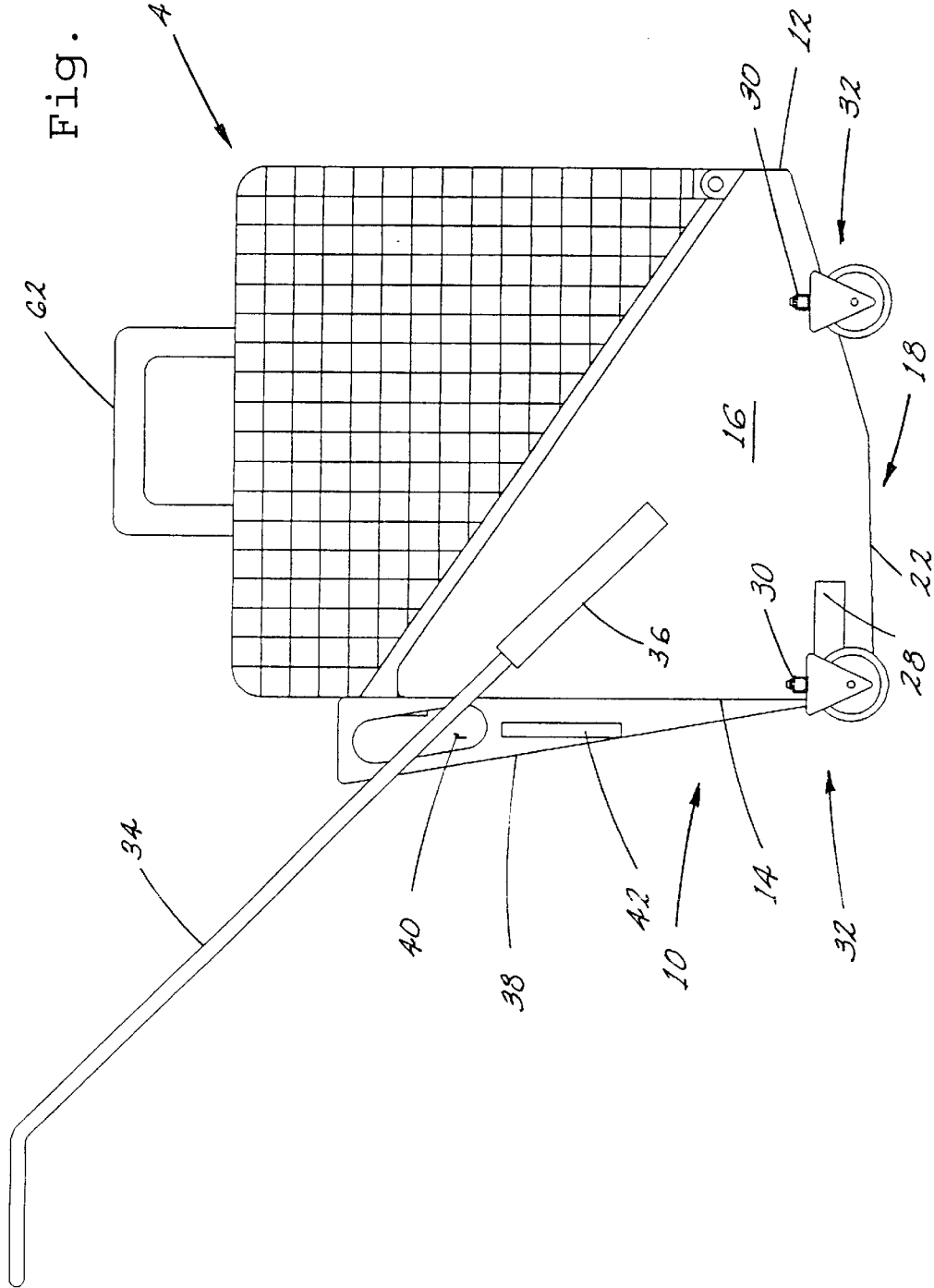
FIG. 1 is a side view of the animal carrier of the invention.
Figure 2:
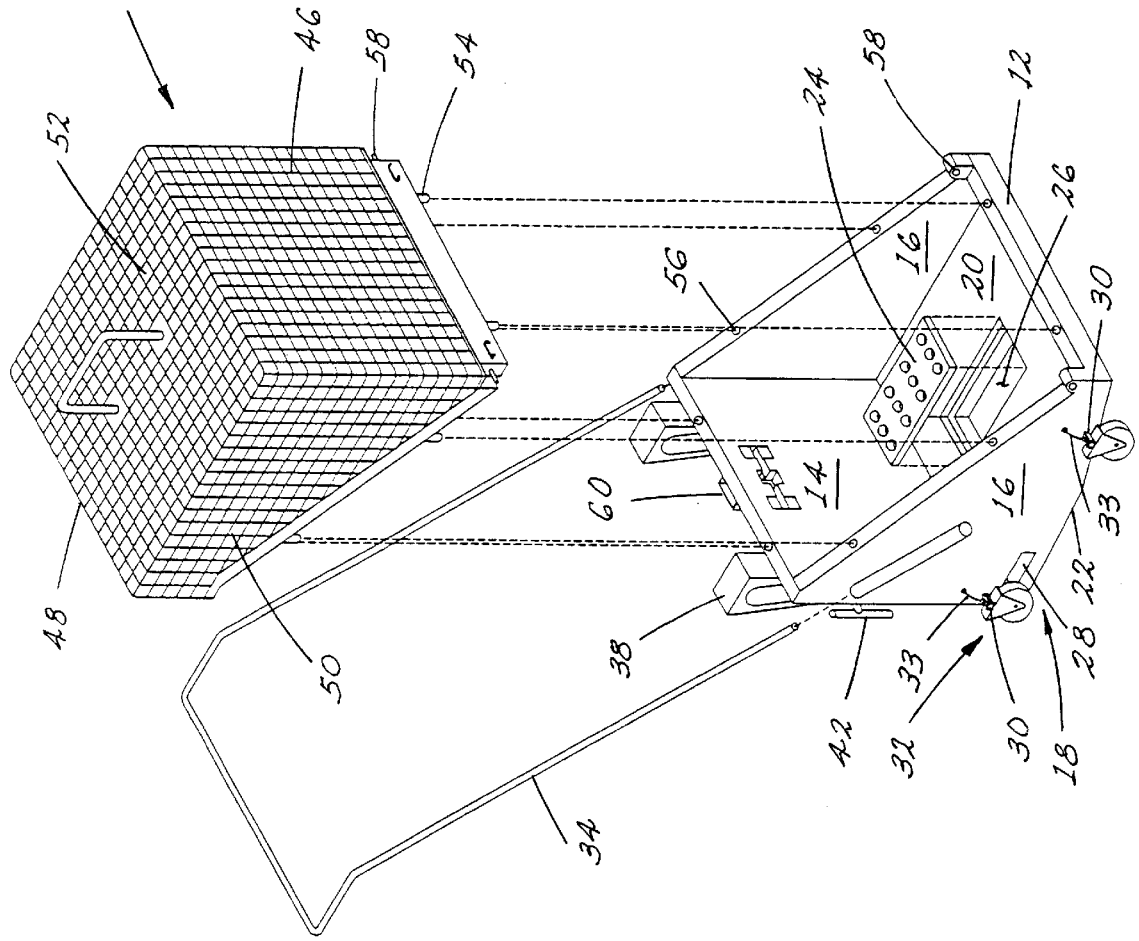
FIG. 2 is an exploded perspective view of the carriage of FIG. 1.

Turning now to the drawings, FIG. 1 is a side view of the pet carrier of the invention. The carrier consists of carriage 10 which, in side view, is substantially triangular shaped and is formed with a front 12, a rear 14, and a pair of sides 16 intersecting with both the front and rear. Generally, rear 14 extends vertically about 2' while front 12 extends vertically only about 3". Side 16 connects with the upper edges of both the front and rear. Bottom 18, as best seen in FIG. 2, extends substantially perpendicularly from the front, back, and sides. Obviously, the size of the carrier, and therefore the carriage, varies depending on the size and type of the animal to be conveyed. It is conceived that a carrier for anything from a small cat to a large dog will be available.

Bottom 18 consists of an inner layer 20 and a lower layer 22. Inner layer 20 is substantially planar and includes a removable perforated plate 24 which mounts substantially centrally of inner layer 22. Lower layer 22 is formed spaced from the inner layer forming chamber 26. Chamber 26 is accessible by removing plate 24 or through an opening 28 formed in at least one of the sides 16.

In use, an absorbent pad or other suitable material is positioned in chamber 26. This provides an absorbing member for fluids which may be expelled onto inner layer 20.

Lower layer 22 is contoured so that substantially the rear half is perpendicular of the plane along which rear 14 extends while the approximate forward half thereof extends upwardly until it connects with the lower edge of front 12. The contour produced generally aligns with the angle of the bottom of a vehicle seat.

Each side 16 of carrier 10 is provided with two shaped openings which are each adapted to receive a shaped peg 30 in a non-rotating and removable manner. Removable locks 33 may be utilized to lock pegs 30 in their respective openings when desired. Outer ends of pegs 30 carry casters 32. Each caster is adapted to swivel in a 360° circle as is usual. The casters are designed to support carriage 10 for movement over a supporting surface.

Figure 3:
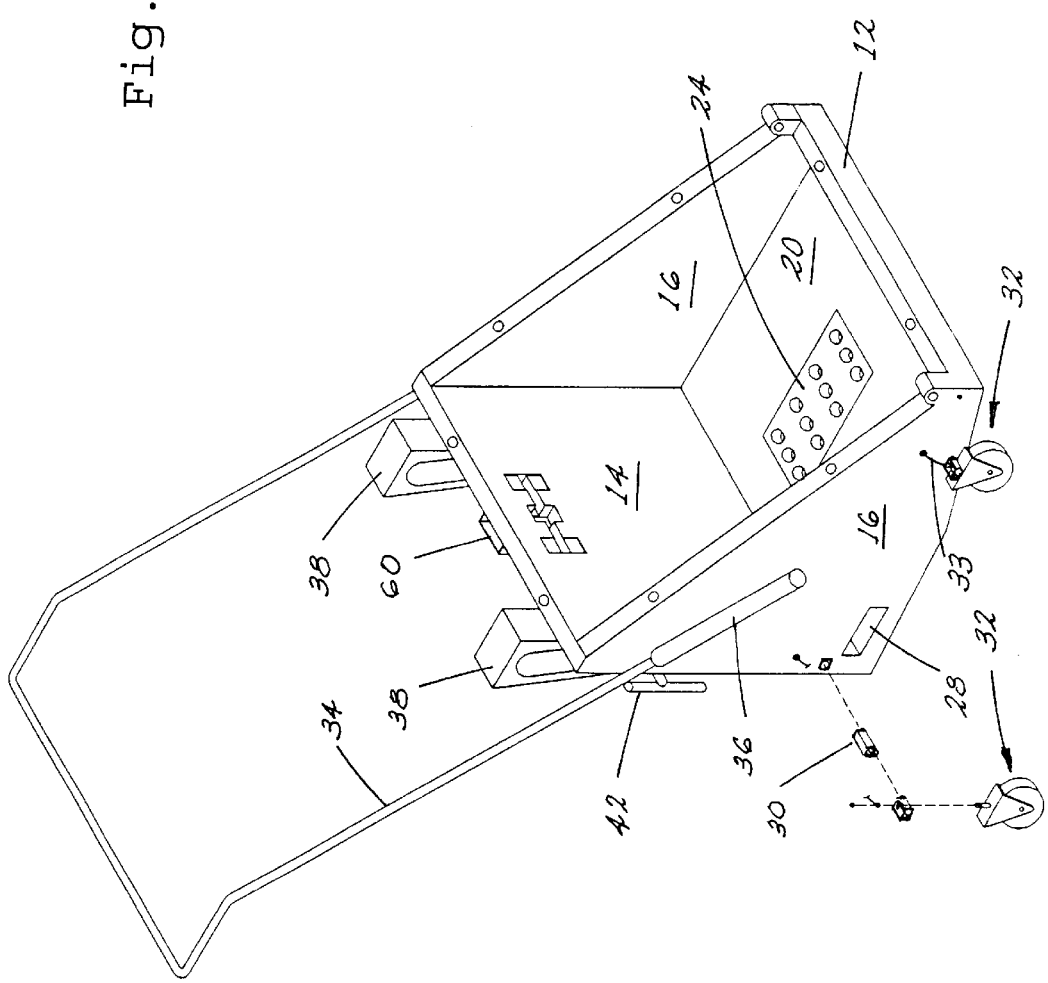
FIG. 3 is a perspective view showing with the cage removed.
Figure 4:
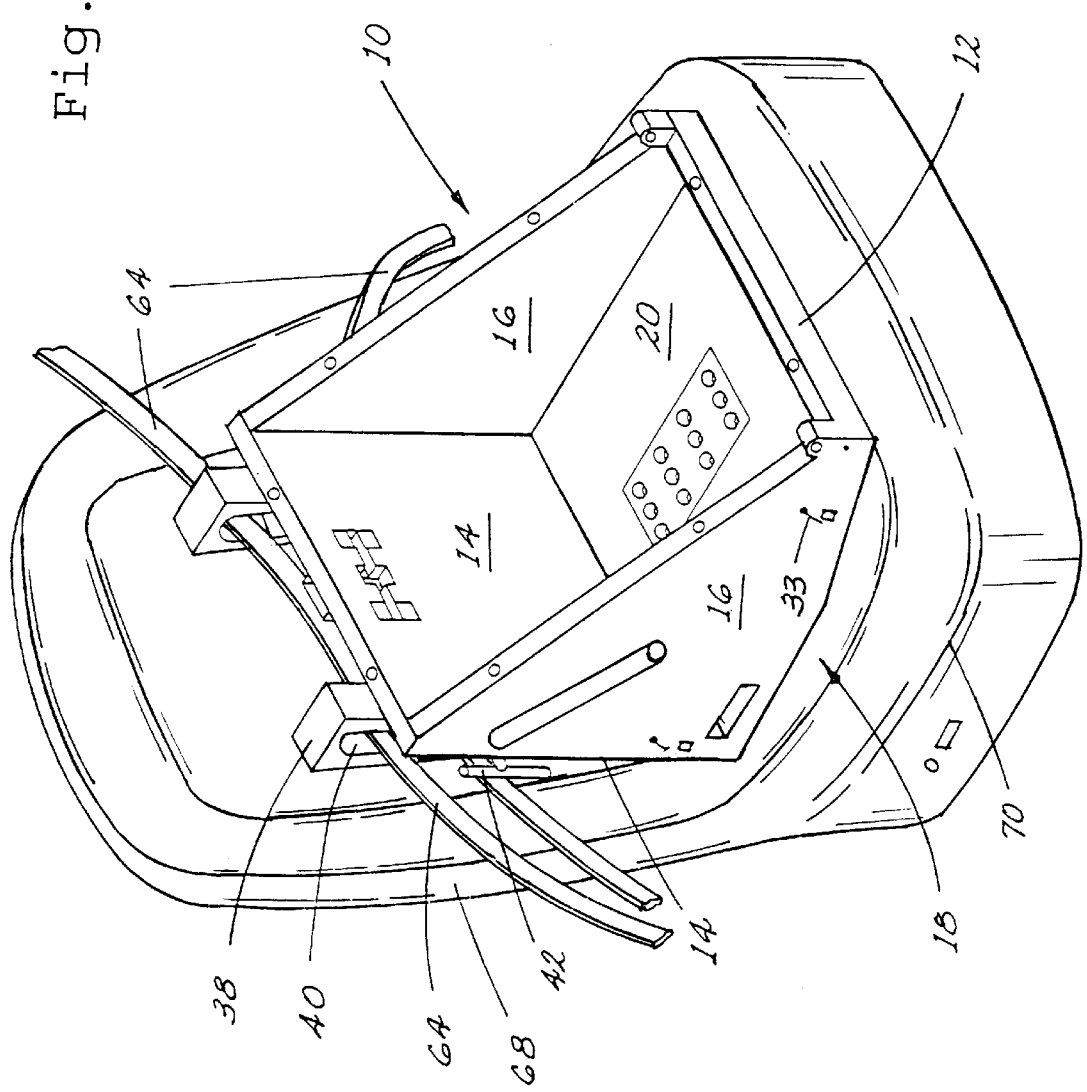
FIG. 4 is a perspective view showing the carriage secured with a vehicle seat.

A U-shaped handle 34 is removably engaged in a socket 36 which are arranged on each side 16. Handle 34 may be removed, as indicated in FIG. 2, when it is desired to mount the carrier on a vehicle seat as indicated in FIG. 4. It may also be desirable to remove casters 32 at this time. This may be done by simply removing pegs 30 from their respective carrying hole as shown in FIG. 3.

Connected with back 14 are a pair of horizontally spaced wedges 38 which are generally triangular shaped with two longer sides extending generally in the vertical direction of back 14 and the upper side extending generally perpendicular of the plane in which the back extends. Wedges 38 are generally parallel with the upper sides with the upper sides being slightly above the upper edge of back 14. An elongated opening 40 is formed in each wedge 38 in generally horizontally alignment. Below and outwardly of each opening 40 a T-shaped extension is attached to each wedge 38. See FIGS. 2, 3, and 4.

In order to provide conditions which are as safe and as comfortable as possible for the animal during transport by vehicle the carrier is positioned in the seat of a vehicle as shown in FIG. 4. The configuration of bottom 18 of carriage 10 generally conforms with the contour of lower seat 70 while rear 14 is located against seat back 68. Wedges 38 act to space the upper portion of rear 14 away from seat back 68 and into a vertical position. The seat belt 64 is drawn from its normal upper anchored position down through holes 40 and is connected in its usual position adjacent seat bottom 70. In the event the seat belt needs to be held in a lower position within holes 40 it may be looped about T-shaped extensions 42. In the position shown the carriage is securely fastened to the seat with inner layer 20 of bottom 18 extending in a position generally parallel with the vehicle supporting surface. With the carrier in this position, the animal may be placed in the carriage and top 44 attached. Alternatively, the animal may be confined within the carrier when it is attached to the seat.

Top 44 is formed to have a front 46, rear 48, a top 52, and a pair of sides 50 which interconnect along edges thereof. Top 44 is preferably formed of spaced parallel wire strands interconnected at points of crossover. Top 44 is of a size which matches the contour of carriage 10, that is the combined lengths of fronts 46 and 12 is equal to the combined lengths of rears 48 and 14. Lower edges of sides 50, front 46, and rear 48 may carry pegs 54 which are adapted to fit into holes 56 formed in the upper edges of the front which act to more stably connect top 44 with carriage 10. Alternatively, or in combination with, it may be desirable to provide pivot members 58 of any usual type, adjacent the lower edge of front 46 and the upper edge of front 12.

In either of these arrangements it is desirable to provide a fastening member 60, of any known type, which acts to removably secure top 44 with carriage 10 when an animal is confined within the carrier. Also, a hand grip 62 may be attached with top 44 to assist in picking up and carrying the carrier by hand. It is preferred that hand grip 62 is pivotally mounted so that it may lay down when not in use.

In practice, the carrier may be of various sizes capable of carrying various sized animals from large dogs to small cats. It possesses the capability of being transported by hand by way of hand grip 62, of being pushed by way of handle 34 and casters 32, and of being transported by vehicle in a safe and secure manner by way of seat belt 64 as shown in FIGS. 1 and 4.

While a preferred embodiment of the invention has been described using specific terms, such description is for illustrative purposes only, and it is to be understood that changes and variations may be made without departing from the spirit or scope of the following claims.

What is claimed is:

1. An animal carrier for use inside and outside of vehicles comprising:
    a cage-like enclosure having a top, a front, a rear, and a pair of sides intersecting with at least said front;
    a carriage for supporting said enclosure having a bottom, a front, a rear, and a pair of sides intersecting with at least said rear;
    attachment members removably connecting said cage with said carriage; and,
    at least one wedge secured with one of said cage-like rear and said carriage rear, said wedge being triangularly shaped with two sides extending in the direction of said rear of said cage-like enclosure and said carriage and a third side extending along a plane substantially perpendicularly of the plane of said rear of said cage-like enclosure and said carriage, said wedge being adapted to be engaged with a seat belt of said vehicle for removably securing said carrier within said vehicle.

2. The carrier of claim 1 including casters supporting said carrier for movement over a supporting surface.

3. The carrier of claim 2 including a handle projecting from said carrier providing means for pushing said carrier over said supporting surface.

4. The carrier of claim 3 wherein said handle is removable.

5. The carrier of claim 2 including caster mounting members removably mounting said casters to said carriage.

6. The carrier of claim 1 wherein said wedge is secured with said carriage rear.

7. The carrier of claim 6 wherein there are two of said wedges secured in horizontally spaced positions.

8. The carrier of claim 1 wherein said at least one wedge includes an opening for receiving said seat belt.

9. The carrier of claim 8, including an extension extending from one side of said at least one wedge, said extension being adapted to engage with said seat belt.

10. The carrier of claim 1 wherein said bottom of said carriage includes an inner upper layer and an outer lower layer, said upper layer extending substantially along a plane substantially perpendicular to the plane along which said back of said carriage extends and said lower layer being contoured to substantially conform with the angle of a vehicle seat.

11. The carrier of claim 1 wherein said bottom of said carriage includes an inner upper layer and an outer lower layer forming a chamber containing absorbing material, said inner layer having a perforated area opening into said chamber, whereby liquids deposited onto said upper layer pass through said perforations and are contained by said absorbing material.

12. A portable animal carrier for use with vehicles comprising:

a cage-like enclosure having a plurality of sides and a top;

a carriage having at least a bottom, a front, and a rear with a connecting member for connecting with a vehicle seat belt;

attachment members connecting said cage with said carriage forming an enclosure for said animal;

said bottom of said carriage including an inner surface and an outer surface forming a chamber therebetween for receiving absorbable material, said outer surface being contoured so that a portion of said outer surface adjacent said front extends upwardly and away from that portion of said outer surface adjacent said rear forming said outer surface substantially aligned with an angle along which a seat of a vehicle extends, said inner surface extending along a single plane substantially perpendicular to a plane along which said rear of said carriage extends, said inner surface including an opening covered with a removable perforated plate for access into said chamber; whereby, said carriage, when placed on a vehicle seat will provide a substantially horizontal inner surface for support of said animal.

13. The carrier of claim 12 wherein said carrier may be secured with said seat by engaging said seat belt with said connecting member.

* * * * *